US012791741B2

(12) United States Patent
Kriegler et al.

(10) Patent No.: US 12,791,741 B2
(45) Date of Patent: Nov. 10, 2026

(54) METHOD FOR PROVIDING ELECTRICAL POWER TO A DETECTOR

(71) Applicant: KETEK GmbH Halbleiter-und Reinraumtechnik, Munich (DE)

(72) Inventors: Florian Kriegler, Rohrbach (DE); Christoph Berger, Munich (DE); Thomas Rudolf Ganka, Munich (DE); Niklas Willems, Munich (DE); Christian Zacher, Munich (DE)

(73) Assignee: KETEK GmbH Halbleiter- und Reinraumtechnik, Munich (DE)

( * ) Notice: Subject to any disclaimer, the term of this patent is extended or adjusted under 35 U.S.C. 154(b) by 134 days.

(21) Appl. No.: 18/751,923

(22) Filed: Jun. 24, 2024

(65) Prior Publication Data

US 2024/0427033 A1 Dec. 26, 2024

Related U.S. Application Data

(63) Continuation-in-part of application No. 18/340,461, filed on Jun. 23, 2023, now Pat. No. 12,644,998.

(51) Int. Cl.
*G01T 1/24* (2006.01)

(52) U.S. Cl.
CPC .............. *G01T 1/244* (2013.01); *G01T 1/247* (2013.01)

(58) Field of Classification Search
CPC .................................................... G01T 1/2006
See application file for complete search history.

(56) References Cited

U.S. PATENT DOCUMENTS

| | | | | |
|---|---|---|---|---|
| 11,397,270 | B2 | 7/2022 | Rettenmeier et al. | |
| 11,415,710 | B2 | 8/2022 | Battyani | |
| 2006/0114343 | A1 | 6/2006 | Zhang et al. | |
| 2008/0192889 | A1 | 8/2008 | Rohde et al. | |
| 2010/0264502 | A1* | 10/2010 | Christophersen | H10F 30/29 257/E31.038 |
| 2017/0276803 | A1 | 9/2017 | Battyani | |
| 2020/0057168 | A1* | 2/2020 | Evrard | G01T 1/2006 |
| 2022/0342090 | A1 | 10/2022 | Battyani | |
| 2023/0352614 | A1* | 11/2023 | Pellegrini | G01T 1/24 |

FOREIGN PATENT DOCUMENTS

| | | | |
|---|---|---|---|
| EP | 3226037 | B1 | 6/2021 |
| EP | 3885798 | A1 | 9/2021 |

OTHER PUBLICATIONS

C. L. Britton et al., "Characteristics of High-Rate Energy Spectroscopy Systems Using HPGe Coaxial Detectors and Time-Variant Filters", IEEE Transactions on Nuclear Science, vol. 31, Isuue No. 1, pp. 455-460, Feb. 1984, Total pp. 06.

(Continued)

*Primary Examiner* — Edwin C Gunberg
(74) *Attorney, Agent, or Firm* — Slater Matsil, LLP

(57) ABSTRACT

In an embodiment a method for providing electrical power to a detector includes providing a high voltage by a high voltage source, generating ring voltages from the high voltage and supplying one ring voltage to each ring electrode and generating a backside contact voltage from the high voltage and supplying the backside contact voltage to the backside electrode, wherein the ring voltages are uncontrolled and wherein the backside contact voltage is adjusted such that a difference voltage between a first ring voltage and the backside contact voltage is constant.

9 Claims, 6 Drawing Sheets

(56) References Cited

OTHER PUBLICATIONS

Donald A. Landis et al., "Energy-Dependent Losses in Pulsed-Feedback Preamplifiers", Presented at the 1978 IEEE Nuclear Science Symposium, Oct. 18-20, 1978, Washington, D.C., Total pp. 13.
Donald A. Landis et al., "Energy-Dependent Losses in Pulsed-Feedback Preamplifiers", IEEE Transactions on Nuclear Science, vol. 26, Issue No. 1, pp. 428-432, Feb. 1979, Total pp. 05.
Donald. A. Landis et al., "Transistor Reset Preamplifier for High Rate High Resolution Spectroscopy", IEEE Transactions on Nuclear Science, vol. 29, Issue No. 1, pp. 619-624, Feb. 1982, Total pp. 06.
F. S. Goulding et al., "Signal Processing for Semiconductor Detectors", IEEE Transactions on Nuclear Science, vol. 29, Issue No. 3, pp. 1125-1141, Jun. 1982, Total pp. 17.
Guoqiang Zeng et al., "Reset Charge Sensitive Amplifier for Nal(TI) Gamma-Ray Spectrometer", Applied Radiation and Isotopes, vol. 97, pp. 63-69, Mar. 2015, Total pp. 07.
Mikhail A. Mikhailov et al., "Synchronous Reset In Pulsed Charge Restoration Detector Arrays", 2008 IEEE Nuclear Science Symposium Conference Record, pp. 409-411, Oct. 19-25, 2008, Dresden, Germany, Total pp. 03.
N. W. Madden et al., "An Improved Operating Mode for a Si(Li) X-Ray Spectrometer", IEEE Transactions on Nuclear Science, vol. 37, Issue No. 2, pp. 171-176, Apr. 1990, Total pp. 06.
T. Nashashibi et al., "Integrated FET and Charge Reset Device for Gamma Spectrometers", IEEE Transactions on Nuclear Science, vol. 38, Issue No. 2, pp. 77-82, Apr. 1991, Total pp. 06.
Tamas Lakatos et al., "A Simple Pulsed Drain Feedback Preamplifier for High Resolution High Rate Nuclear Spectroscopy", Nuclear Instruments and Methods in Physics Research Section A: Accelerators, Spectrometers, Detectors and Associated Equipment, vol. 378, Issue No. 3, pp. 583-588, Aug. 21, 1996, Total pp. 06.

* cited by examiner

METHOD FOR PROVIDING ELECTRICAL POWER TO A DETECTOR

CROSS-REFERENCE TO RELATED APPLICATIONS

This application is a continuation-in-part application of U.S. application Ser. No. 18/340,461, filed on Jun. 23, 2023, which application is hereby incorporated herein by reference.

TECHNICAL FIELD

A method for providing electrical power to a detector is specified. Furthermore, a detector device is specified. Moreover, a method for processing a detector signal is specified.

SUMMARY

Embodiments provide an improved method for providing electrical power to a detector, which is easy to implement. Other embodiments provide a detector device which can carry out such a method. Yet other embodiments provide an improved method for processing a detector signal.

According to at least one embodiment of the method for processing a detector signal, the method is carried out by a signal chain. The signal chain comprises a detector and an amplifier in a signal processor as components. In particular, the detector is configured to detect an incidence of a photon as a detection event. Preferably, the detector is an optoelectronic semiconductor detector. For example, the detector is a silicon drift detector. In particular, the detector is configured to detect x-ray radiation.

The amplifier is, for example, configured to process the detection event detected by the detector to an output voltage. For example, the amplifier is a charge sensitive amplifier. That is, each detection event is amplified and converted to a voltage according to an amplifying factor. For example, the amplifier factor is chosen such that a photon with an energy of 5.9 keV corresponds to 500 to 1100 least significant bits of a 16-bit analog to digital converter configured to convert the analog detector signal of the detector to a digital signal.

The signal processor is in particular configured to digitalize the output voltage of the amplifier and to evaluate the preferably digitized output voltage of the amplifier. For example, the signal processor comprises an analog to digital converter, ADC for short, and/or a processing unit, for example an integrated circuit, such as a microcontroller or preferably a field programmable gate array, FGPA for short.

According to at least one embodiment of the method, the method comprises the following steps:

Detecting a plurality of detection events by the detector. For example, each time a photon, in particular an x-ray photon, incidences at the detector, a detector event is detected. In particular, charge carriers emerge in the detector in the event of a detection event.

Increasing an output voltage of the amplifier after each detection event. In particular, the output voltage of the amplifier is the detector signal. In the following the terms "detector signal" and "output voltage" of the amplifier may be used interchangeably.

In particular, charge carriers emerging in the detector at the detection event are collected by a capacitor of the amplifier, which creates a voltage signal. Thereby, at each detection event, the output voltage is increased by a step. A height of the step is proportional to an energy of the photon which causes the detection event.

Resetting the output voltage of the amplifier if the output voltage of the amplifier exceeds a threshold due to a threshold event. The threshold event is in particular the incidence of a photon to the detector which leads to exceeding the threshold of the output voltage of the amplifier. That is, the threshold event preferably is a last detection event after which the output voltage of the amplifier is reset.

The threshold is smaller than a maximum voltage value determined by an overdrive value of an input voltage of the signal processor to which the output voltage of the amplifier is connected. If the output voltage of the amplifier would exceed the maximum voltage an evaluation of the threshold event leading to the exceeding of the output voltage of the amplifier and any following detection events would not be possible to evaluate. Therefore, a reset of the output voltage of the amplifier is necessary. If the reset would be carried out only if the output voltage would exceed the maximum voltage, the threshold event may not be evaluated since the height of the last step of the output voltage of the amplifier would not be fully accessible. Therefore, the reset is triggered if the output voltage exceeds the threshold which is below the maximum voltage. In turn, the threshold event leading to the output voltage to exceed the threshold can be fully evaluated, since the output voltage may exceed the threshold, but not reach the maximum voltage. For example, a distance between the threshold and the maximum voltage corresponds to an energy of a high-energy photon. That is, even if a high-energy photon strikes the detector, the output voltage would not reach the maximum voltage but would only exceed the threshold. For example, the high-energy photon comprises an energy of 40 keV.

The reset is determined by processing of the threshold event only irrespective of other detection events. In particular, the reset is performed after processing of the threshold event, which in particular leads to the exceeding of the threshold by the output voltage, is terminated. That is, the threshold event is fully evaluated by the signal chain before the output voltage is reset, preferably in any case. For example, a processing time of the detection event and/or the threshold event is determined by filter constants of energy filters of the signal processor that are applied to the output voltage to generate a spectrum. For example, a digital trapezoid filter which is described by the filter constants peaking-time and gap-time is applied. In this case the processing time is at least a sum of a peaking-time and a gap-time of these filters. The processing time is, for example, between 0.1 us and 10 μs.

The reset is triggered by a signal edge of a reset pulse. For example, the reset is triggered by a rising or a falling edge of the reset pulse. In particular, the reset pulse is applied to a reset input of the amplifier. Preferably, the reset pulse is applied if the reset of the output voltage is necessary.

According to at least one embodiment of the method, the reset pulse is applied to the reset input of the amplifier by the signal processor. In particular, the signal processor monitors the output voltage of the amplifier and applies the recent parts if the reset is necessary.

According to at least one embodiment of the method, the output voltage of the amplifier is reset to the fixed minimal voltage value. That is, each reset restores the minimal voltage value of the output voltage.

The method for processing a detector signal is, inter alia, based on the following technical considerations. In detector devices the activation of the reset input of the amplifier causes a falling signal of the output voltage as long as the reset input is active. In other words, the reset is state-controlled. Such modern amplifiers typically show short reset times, for example the reset time of 100 ns to reset 2 V. That is, a width of the reset pulse has to be chosen with high precision if a predefined lower voltage level is aimed. If the reset input is active for too long, the output voltage falls below a working region of the signal processor and the evaluation of the output signal has to be paused. On the other hand, if the reset input is only activated for short period of time, the reset has to be performed more often. However, pulse widths are generally hard to define with high precision due to, for example, a given clock frequency of the signal processor, ambient temperature, temperature of the detector, tolerance ranges of the amplifier and the like. Therefore, a special unit to adjust the reset time is typically needed, which in turn increases the effort of the reset method and thus the reset logic and the reset circuit.

The method described herein makes use of the idea of using an edge-controlled reset. That means that the reset is triggered if a signal edge, in particular a rising/falling edge, of the reset pulse is detected at the reset input of the amplifier. This is in particular possible since the reset is performed to a fixed minimal voltage value. This minimal voltage value is preferably adapted to the input of the signal processor and further preferably adapted to a working range of the ADC of the signal processor. In particular, the minimal value is chosen such that it lies at a lower boundary of the working range of the ADC.

Since the reset is performed to the minimal voltage value, the height and/or width of the reset pulse has not to be strictly controlled by the signal processor. That is, any reset pulse adjustment unit or the like is not necessary.

Furthermore, the minimal voltage value is independent of the reset pulse, in particular of the reset pulse width. As a consequence, the minimal voltage value is defined independently of a reset time of the amplifier and the factors influencing the pulse width and/or the reset time. For example, if a pulse with a large width is applied to the reset input of the amplifier, the output voltage is set to the minimal voltage and does not continue to decrease, even if the reset input is still active. Hence, the pulse width can be chosen with a higher tolerance and lower precision, making any pulse width adjustment obsolete and facilitating the reset of the output voltage. It is further possible that the reset pulse comprises a width smaller than the reset time of the amplifier.

Furthermore, the usage of an amplifier with a small reset time is possible. For example, the amplifier used herein comprises a reset time of smaller than 200 ns, for example around 100 ns, for performing a reset to the minimal voltage value. It is thus not necessary to perform only a partial reset to save time. Hence, the total working range of the amplifier and/or the ADC of the signal processor is available after each reset.

A further advantage of the present method is that the threshold event is not lost. Consequently, the loss of signal due to the reset decreases, in particular at high photon energies on high counting rates. Hence, the signal yield may be increased, resulting in proper measurement statistics in a short period of time.

By choosing a comparatively low amplification factor of the amplifier, for example that a 5.9 keV photon corresponds to 500 to 1100 least significant bits of a 16-bit ADC, for example compared to conventionally corresponding to 1500 least significant bits, the reset test needs to be performed less often and the energy efficiency is increased.

According to at least one embodiment of the method, the processing of the threshold event exceeding the threshold of the output voltage of the amplifier is continued in the case that a further detection event is detected during a procession time of the threshold event. The procession time is determined, in particular, by a period of time needed by the signal processor to evaluate a detection event and/or the threshold event. For example, this period of time is determined by filter constants of at least one digital filter applied to the, in particular digitized, detector signal. For example, a digital trapezoid filter which is described by the filter constants peaking-time and gap-time is applied. A sum of filter constants for these filters are, for example, in a range between 0.1 and 10 μs.

Typically, the reset is performed immediately if a further detection event is detected during the processing time of the threshold event. In the methods described herein, however, the processing of the threshold event is finished before the reset is performed. This means, in particular, that the processing time of the threshold event passes before the reset is performed. As a consequence, a period of time it takes for the reset to be performed after the output voltage of the amplifier exceeds the threshold due to a detection event is determined by the processing time, independently of the detection of a further detection event during the processing time. This advantageously facilitates the methods described herein, since no further reset criteria corresponding to the detection of a further detection event during the processing time is needed.

According to at least one embodiment the reset is triggered if the threshold is exceeded without a detection event. It is possible that the threshold is exceeded even if no detection event is detected by the detector. This may be due to a leaking voltage of the detector. In order for the detector to be able to detect, for example, a high-energy photon, the output voltage of the amplifier is reset if the output voltage exceeds the threshold due to the leaking voltage.

According to at least one embodiment of the method, the signal chain comprises a further amplifier. The further amplifier may be a preamplifier configured to process the output voltage of the amplifier, i.e., the detector signal, to the signal processor. Alternatively, it is possible that the further amplifier is integrated in the amplifier. Preferably, the further amplifier comprises a storage unit. It is possible that the amplifier additionally or alternatively comprises a storage unit. The storage unit of the amplifier and/or the further amplifier is formed, for example, with an EEPROM. The storage unit of the amplifier and/or the further amplifier may be used to store one or more operation parameters of the signal chain. These parameters comprise among other things, for example, a supply voltage of the detector. Hence, by storing operation parameters in the storage unit, the functionality of the detector, the amplifier, and/or the further amplifier may be determined. In other words, the further amplifier is programmable.

According to at least one embodiment of the method, the output voltage of the amplifier is further processed by the further amplifier, wherein an offset and/or a gain are added to the output voltage, i.e., the detector signal, by the further amplifier. In particular, values of the offset and the gain are stored in the storage unit of the further amplifier. That is, the offset and the gain may be chosen by storing corresponding values of the offset and the gain in the storage unit.

According to at least one embodiment of the method, the minimal voltage value and/or the maximum voltage value are stored in the storage unit of the further amplifier or in a storage unit of the amplifier. The storage unit of the amplifier may comprise the same features, functions and effects as the storage unit of the further amplifier. As a result, the further amplifier, respectively the total signal chain, are flexibly usable. This means that by varying the minimal voltage and/or the maximum voltage the further amplifier or the total signal chain may be used in different applications which require, for example, a special amplification factor or a certain working range of an ADC of the signal processor.

According to at least one embodiment of the method, the output voltage of the amplifier, i.e., the detector signal, is compared to the threshold at the minimal voltage value by an upper limit comparator and a lower limit comparator, respectively. The upper limit comparator and the lower limit comparator may be part of the amplifier and/or the further amplifier. It is possible that the upper limit comparator is part of the amplifier and the lower limit comparator is part of the further amplifier or vice versa. For example, the detector signal may be processed by the further amplifier. For example, a gain or an offset may be applied to the detector signal prior to comparison by the comparators. In this case the threshold and/or the minimal voltage are preferably adapted to the gain and the offset accordingly.

If the output voltage of the amplifier reaches the threshold, the reset to the minimal voltage value is carried out. In particular, the reset input of the amplifier is connected to a reset logic of the further amplifier or the amplifier. Preferably, the reset logic is connected to a reset output of the signal processor, by which a reset signal is provided which triggers the reset. The reset logic further preferably comprises the outputs of the upper limit comparator and the lower limit comparator as inputs. Hence, the reset logic determines whether the output voltage of the amplifier is reset on the basis of the results of the upper limit comparator, the lower limit comparator and/or the reset signal provided by the signal processor.

According to at least one embodiment of the method, at least one actual value of at least one supply voltage of the detector is controlled to comply with a set value of the respective supply voltage stored in the storage unit of the amplifier or the storage unit of the further amplifier. Hence, a control loop is carried out by the further amplifier.

For example, mutually different detectors comprise different requirements for the supply voltages, in particular if the detectors are silicon drift detectors. A lateral drift field is generated in a silicon drift detector in order to guide charge carriers generated by the detection event to an output electrode. In order to generate the drift field as intended, several high voltages are required, such as a backside contact voltage and several ring voltages. If, for example, one or more high voltages are not suitable for the specific silicon drift detector, a collection of charge carriers may be incomplete or long detection times may result.

The detector, in particular if the detector is a silicon drift detector, may comprise a semiconductor body and several ring electrodes on a first main side of the semiconductor body. The ring electrodes are preferably concentrically arranged around an anode of the detector serving as the output electrode. For example, a first ring electrode is the ring electrode arranged closest to the anode. At a second main side of the semiconductor body a backside electrode is preferably arranged.

During operation of the detector, ring voltages may be applied to the ring electrode. For example, a first ring voltage is applied to the first ring electrode. At the backside electrode a backside contact voltage may be applied. By these voltages, an electric field, i.e., the lateral drift field is generated in the semiconductor body, by which charge carriers that are generated in the semiconductor body during a detection event are guided to the output electrode.

In particular, different detectors have different requirements for the high voltages. The reasons for this may be, for example, different sizes of the silicon drift detectors or variations in the semiconductor process or the semiconductor material of the silicon drift detectors. By using a programmable further amplifier, the signal chain may be flexibly adapted to different detectors, since the detectors may each be operated with optimal supply voltages. Furthermore, by implementing the control loop by the further amplifier the stability of the supply voltages, for example against change in ambient temperature or the detector temperature, may be increased.

According to at least one embodiment of the method, exactly one first supply voltage of the detector is stored in a storage unit of the amplifier of the further amplifier. Preferably at least one further supply voltage for the detector is determined from the first supply voltage by calculation, in particular arithmetic calculation.

For example, a backside contact voltage of the silicone drift detector is the first supply voltage and is controlled to a specific set value. In particular, the set value is stored in the storage unit. In this case several or all ring voltages of the silicon drift detector may be determined by applying certain factors, for example, by multiplying, adding or subtracting, to the backside contact voltage. For example, a certain factor is assigned to each ring voltage. Preferably, the factors are stored in the storage unit.

Alternatively, it is possible that any other supply voltage is chosen as the first supply voltage, for example, one of the ring voltages. In this case some or all other supply voltages are determined by applying certain factors in a similar way as described above.

If the factors are fixedly stored in the storage unit, a temperature drift of the silicon drift detector may advantageously not affect the ratio of the supply voltages.

According to at least one embodiment of the method, the ring voltages are uncontrolled. Preferably, the detector is a silicon drift detector.

In particular, the ring voltages are generated by voltage dividers from a high voltage source. Preferably, the voltage dividers are fixed. This means in particular that a dividing ratio provided by the voltage dividers is fixed and cannot be changed or controlled without, for example, replacing the voltage divider. Thus, the ring voltages in particular dependent on the high voltage source, the voltage divider and an electrical resistance emerging between a ring voltage divider, representing an electrical resistance between different ring electrodes of the detector to which the ring voltages are applied. The ring voltage divider is in particular implemented at the detector, for example at a detector chip of the detector, and may not be controlled.

According to at least one embodiment, a voltage difference between the first ring voltage and the backside contact voltage is fixed. In particular, the backside voltage is adjusted to the first ring voltage such that the difference voltage is fixed. Preferably, the adjustment of the backside contact voltage is carried out by a control circuit.

For example, the control circuit receives a set value for the backside contact voltage and the first ring voltage as well as the high voltage from the high voltage source as an input and provides the backside contact voltage as an output. In particular, the control circuit generates the backside contact voltage from the high voltage depending on the set value and the first ring voltage. Preferably, the first ring voltage and the set value are combined and provide an adjustment value for the high voltage by which the backside contact voltage is generated from the high voltage.

By the control circuit, the set value may be adjusted so that the backside contact voltage can be adjusted such that the voltage difference between the first ring voltage and the backside contact voltage is fixed, for example if the first ring voltage changes. A change of the first ring voltage may be caused by temperature or other external influences.

According to at least one embodiment, the control circuit is an active control circuit. This means in particular that the control circuit actively adjusts the set value to generate a fixed or constant difference voltage between the first ring voltage and the backside contact voltage. The control circuit preferably comprises a regulator. The regulator may comprise an operation amplifier, by means of which a feedback loop can be created. By the regulator, the set value can be actively controlled such that an output of the regulator, for example the backside contact voltage is constant. For example, the adjustment value is determined by means of the operational amplifier.

Preferably, adjusting the set value, and thus the backside contact voltage, can be carried out during operation of the detector. Thus, an active adjustment of the backside contact voltage in order to keep the difference voltage between the first ring voltage and the backside contact voltage can be carried out during ongoing operation of the detector.

By using an active control circuit described here, the difference voltage between the first ring voltage and the backside contact voltage can be kept constant at varying first ring voltages during operation of the detector. This is in particular advantageous since this difference voltage significantly determines a signal rise time of an output signal of the detector. It is thus possible to let the ring voltages, in particular the first ring voltage, be uncontrolled, as the voltage difference can be adjusted by adapting the backside contact voltage by means of the active control circuit. Hence, complexity of control electronics for the detector can be reduced and flexibility of the control electronics can be increased, as the backside contact can be easily adjusted to varying ring voltages.

In at least one embodiment, the method comprises providing electrical power to the detector, wherein the detector comprises a plurality of ring electrodes on a first main side and a backside electrode at a second main side opposite to the first main side. The method for providing electrical power to the detector comprises the following steps:

Providing a high voltage by a high voltage source.

Generating ring voltages from the high voltage and supplying one ring voltage to each ring electrode.

Generating a backside contact voltage from the high voltage and supplying the backside contact voltage to the backside electrode.

In particular the ring voltages are uncontrolled. Preferably, the backside contact voltage is adjusted such that a difference voltage between a first ring voltage and the backside contact voltage is constant.

According to at least one embodiment of the method, the further amplifier comprises a communication interface connected to at least one other component of the signal chain, and at least one component of the signal chain reads and/or writes at least one parameter stored in the storage unit of the amplifier and/or the further amplifier. For example, the further amplifier may be programmed by the communication interface. In particular, components of the signal chain may read the parameters stored in the storage unit of the amplifier and/or the further amplifier and can test their operation accordingly. Furthermore, components of the signal chain may write and/or amend parameters stored in the storage unit of the amplifier and/or the further amplifier in order to optimize the signal chain. For example, the signal chain can perform a compatibility and/or function check by interchanging parameters and/or status information between the components of the signal chain. This enables the detection of errors, thereby reducing the risk of malfunction, damage or excess voltages.

According to at least one embodiment of the method, the signal processor deposits the threshold, the minimal and/or maximum voltage value in the storage unit of the amplifier and/or the further amplifier by means of the communication interface between the further amplifier and the signal processor. Advantageously, the signal processor can adjust the threshold, the minimal and/or maximum voltage value according to a working range of the ADC of the signal processor.

According to at least one embodiment of the method, a communication on the communication interface only takes place out of the processing time of a detection event. For example, the signal processor provides a communication stop signal, indicating the processing of detection events. As long as the communication stop signal is active, the communication on the communication interface is interrupted.

It is possible that by data exchange via the communication interface perturbations of the detector signal emerge that exacerbate the evaluation. The data exchange takes place, for example, on a data bus such as an $I^2C$ bus, a serial peripheral interface (SPI), a universal asynchronous receiver terminal (UART) or the like. Examples of perturbations are capacitive incouplings or steps in a supply or ground potential due to a switching operation on the data bus. In order to avoid these perturbations, the communication via the communication interface takes place at specific times, for example while the reset is performed or during other measurement pauses.

According to at least one embodiment of the method, the signal processor processes the output voltage of the amplifier, i.e., the detector signal, by using at least one filter with at least one filter constant. Examples of the digital filters are a trapezoid filter or a cusp filter. The at least one filter is preferably a digital filter. Therefore, the at least one filter processes a digitized detector signal, for example the output voltage of the amplifier, i.e., the detector signal after it is digitized by the ADC of the signal processor.

According to at least one embodiment of the method, the at least one filter constant is communicated to at least one other component of the signal chain by the communication interface. In particular, filter constants of such filters are specifically adapted to a particular application. Depending on the application, the filter constants comprise a different frequency response. Accordingly, a sensitivity of the processing of the detector signal with respect to noise varies with the filter constants. Via the communication interface, the signal processor may provide the current filter constants to the signal chain. In the signal chain, noise behavior can be adapted such that suppression of noise can be efficiently carried out by the at least one filter. Examples of entities of the signal change that may be adapted are variable constraints of signal ranges or an adaption of switching frequencies of clocked voltage converters. The latter a commonly used in compact and low-loss circuits and may generate a narrow banded perturbation in the signal. By changing the switching frequencies to a minimum in the vicinity of the at least one used filter, the influence of these perturbations on the processing of the detector signal may be minimized.

Furthermore, a detector device is specified. In particular, the detector device is configured to carry out the method described herein. That is, all features disclosed for the method for processing a detector signal are also disclosed for the detector device and vice versa.

According to at least one embodiment of the detector device, the detector device comprises a signal chain comprising a detector, an amplifier and a signal processor, wherein the signal chain is configured to perform the method described herein.

According to at least one embodiment of the detector device, the signal chain comprises the further amplifier comprising the storage unit.

According to at least one embodiment of the detector device, the amplifier comprises a storage unit. The storage unit of the amplifier and the storage unit of the further amplifier may comprise the same features, functions and effects.

At least one of the following parameters is stored in the storage unit of the amplifier or the storage unit of the further amplifier: the threshold, the maximum voltage value, a minimal voltage value of the output voltage of the amplifier, an offset value for the output voltage of the amplifier, a gain value for the output voltage of the amplifier, supply voltages of the detector.

According to at least one embodiment of the detector device, the detector is a silicon drift detector and is configured to detect an incidence of a photon as a detection event.

According to at least one embodiment of the detector device, the amplifier is a charge sensitive amplifier configured to process the detection event to the output voltage.

According to at least one embodiment of the detector device, the further amplifier is a preamplifier configured to process the output voltage of the amplifier to the signal processor and supply the detector with the supply voltages.

According to at least one embodiment of the detector device, the signal processor is configured to digitize the output voltage of the amplifier and to evaluate the output voltage of the amplifier.

According to at least one embodiment the of the detector device, the detector device further comprises a detector unit. The detector unit comprises the detector and a thermoelectric cooler. The thermoelectric cooler is connected to the further amplifier by the communication interface. The thermoelectric cooler is in particular configured to read an operation parameter of the detector and to control the temperature of the detector according to the operation parameter.

In particular, detector units comprising a silicon drift detector comprise the thermoelectric cooler. A controller controls the temperature of the detector by means of the thermoelectric cooler. Depending on an application, different detector units use different thermoelectric coolers with different current and voltage limits. These different current and voltage limits, as well as a dynamic behavior such as a pulse response of the thermoelectric cooler, may be stored in the storage unit of the amplifier and/or the further amplifier of the further amplifier. The controller for thermoelectric cooler may read these parameters and adjust the control of the electric cooler in order to optimize cooling of the detector. Thus, the further amplifier and external controller for the thermoelectric cooler may be flexibly combined.

According to at least one embodiment, the detector is a silicon drift detector. The silicon drift detector in particular comprises a semiconductor body and several ring electrodes on a first main side of the semiconductor body. The ring electrodes are preferably concentrically arranged around an anode of the detector serving as the output electrode. For example, a first ring electrode is the ring electrode arranged closest to the anode. At a second main side of the semiconductor body opposite to the first main side a backside electrode is preferably arranged.

During operation of the detector, ring voltages may be applied to the ring electrode. For example, a first ring voltage is applied to the first ring electrode. At the backside electrode a backside contact voltage may be applied. By these voltages, an electric field, i.e., the lateral drift field is generated in the semiconductor body, by which charge carriers that are generated in the semiconductor body during a detection event are guided to the output electrode.

According to at least one embodiment, the detector device comprises a control circuit configured to fix a difference voltage between the first ring voltage and the backside contact voltage to a constant value. In particular, the control circuit is configured to adjust the backside contact voltage such that the difference voltage is constant. For example, the control circuit receives a set value for the backside contact voltage and the first ring voltage as well as the high voltage from the high voltage source as an input and provides the backside contact voltage as an output.

Preferably, the control circuit is an active control circuit configured to actively adjust the set value to generate a fixed or constant difference voltage between the first ring voltage and the backside contact voltage.

In at least one embodiment the detector device comprises a silicon drift detector and a control circuit. The silicon drift detector comprises a plurality of ring electrodes on a first main side arranged concentrically around an output electrode. The silicon drift detector further comprises a backside electrode arranged on a second main side opposite to the first main side. Each of the ring electrodes is configured to be supplied with a ring voltage during operation. The backside electrode is configured to be supplied with a backside contact voltage during operation. The control circuit is configured to fix a difference voltage between a first ring voltage and the backside contact voltage to a constant value.

BRIEF DESCRIPTION OF THE DRAWINGS

Further advantages and advantageous embodiments and further developments of the method for processing a detector signal and the detector device will become apparent from the following exemplary embodiments shown in connection with schematic drawings. Identical elements, elements of the same kind or elements having the same effect, are provided with the same reference signs in the figures. The figures and the proportions of the elements shown in the figures are not to be regarded as true to scale. Rather, individual elements may be shown exaggeratedly large for better representability and/or for better comprehensibility.

In the figures.

DETAILED DESCRIPTION OF ILLUSTRATIVE EMBODIMENTS

Figure 1:
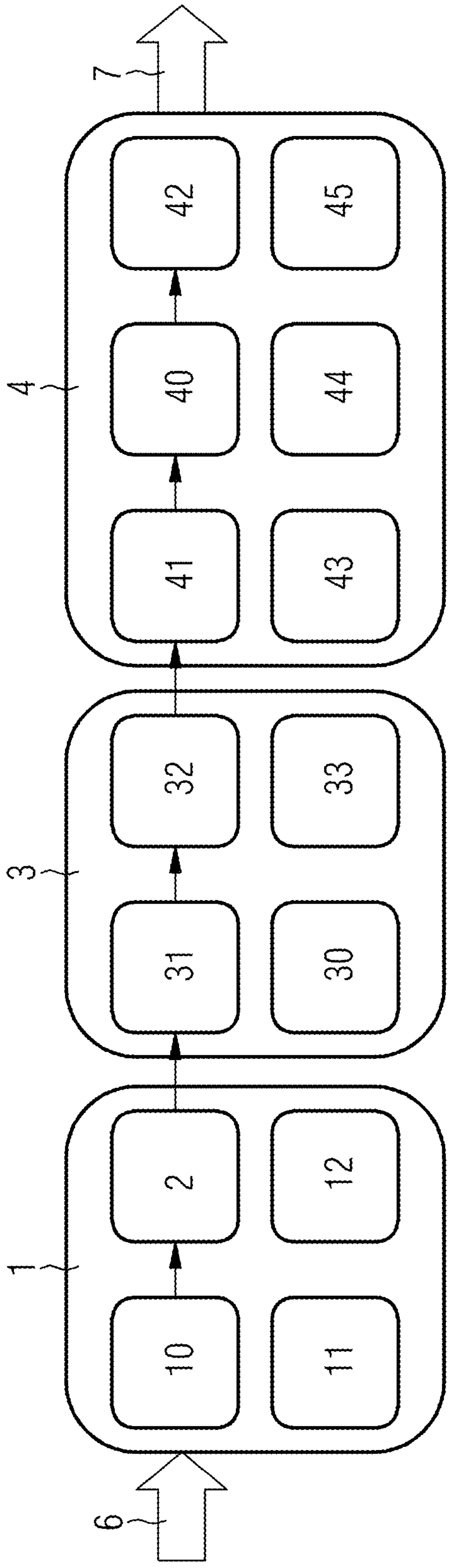
FIGS. 1 and 2 show schematic illustrations of a signal chain used in a method described herein according to an exemplary embodiment.
Figure 2:
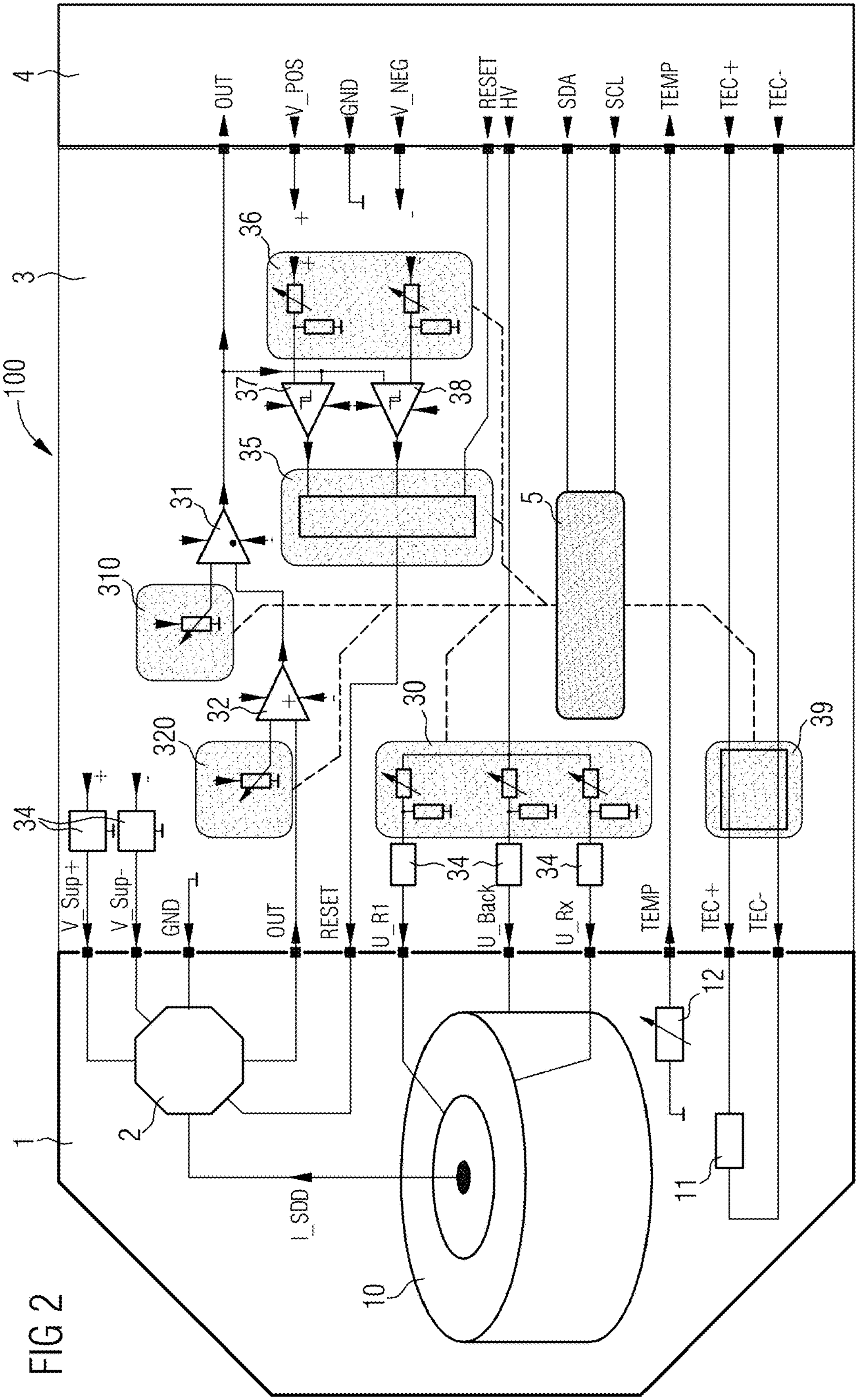

FIGS. 1 and 2 schematically illustrate a signal chain, respectively a detector device 100, used in the method for processing a detector signal according to an exemplary embodiment. The signal chain is configured to evaluate x-ray radiation 6 and to deliver a spectrum 7 as an output.

The signal chain comprises a detection unit 1, an amplifier 2 which may be part of the detector unit 1, a further amplifier 3 and a signal processor 4.

The detection unit 1 comprises a detector 10, a thermoelectric cooler 11 and a temperature sensor 12. The detector 10 is a silicon drift detector configured to detect an incidence of x-ray photons 6 as a detection event. The incidence of x-ray photons 6 causes an emergence of charge carriers in the detector 10, which are collected at a collection electrode. The collection electrode of the detector 10 gives a current I_SDD (compare FIG. 2), which serves as an input for the amplifier 2.

The amplifier 2 is preferably a charge sensitive amplifier. The amplifier 2 collects the charge carriers of the detector 10 in a capacitor and gives an output voltage OUT as an output. The output voltage OUT is also referred to as a detector signal. At each detection event, the output voltage is increased by a step. A height of the step is proportional to an energy of the photon 6 which causes the detection event.

After a plurality of detection events a reset of the output voltage OUT is necessary, since if the output voltage OUT would exceed a maximum voltage determined by an input of the signal processor 4, it would not be possible to evaluate the last detection event leading to the excess of the output voltage OUT, also referred to as a threshold event, and any following detection events. The reset is triggered if the output voltage exceeds a threshold which is below the maximum voltage. A distance between the threshold and the maximum voltage corresponds to an energy of a high-energy photon 6 comprising, for example, an energy of 40 keV.

The input of the signal processor 4 for the detector signal OUT is an analog frontend 41. In the analog frontend 41 the processing signal OUT is conditioned by applying, for example, a variable gain, an anti-aliasing filter and/or a high pass filter. From the analog frontend 41 the detector signal OUT is conducted to an analog-to-digital converter (ADC) 40, where the detector signal OUT is digitized. The ADC 40 has a working range which essentially determines the maximum voltage value.

The reset is triggered by a signal edge, for example a rising or falling edge of a reset pulse RESET. In particular, the reset pulse RESET is applied to a reset input of the amplifier. The reset is performed after processing of the threshold event is terminated, which in particular leads to the excess of the threshold by the output voltage OUT. That is, the threshold event is in any case fully evaluated for a processing time by the signal chain before the output voltage OUT is reset.

The processing time for the detection event and/or the threshold event is mainly determined by an evaluation unit 42 of the signal processor 4. In the evaluation unit 42 at least one digital filter is applied and the spectrum 7 is generated. The evaluation unit 42 is a FPGA. During evaluation in the evaluation unit 42, for example, a digital trapezoid filter which is described by the filter constants peaking-time and gap-time is applied. The filter constants determine the processing time. In the present embodiment, the peaking-time filter constant gives a first part of the processing time of 2 μs and the gap-time filter constant gives a second part the processing time of 0.3 μs, resulting in a total processing time of 2.3 μs. Furthermore, the signal processor 4 comprises a host communication port 45, by which the spectrum 7 may be read by a host, for example a PC.

The reset is performed to a fixed minimal voltage value. In particular, each reset restores the minimal voltage value of the output voltage. This minimal voltage value is preferably adapted to the working range of the ADC 40 of the signal processor 4. Since the reset is performed to the minimal voltage value, a height and/or width of the reset pulse RESET does not have to be strictly controlled by the signal processor 4.

The detection unit 1 further comprises the thermoelectric cooler 11 and the temperature sensor 12. The thermoelectric cooler 11 is configured to cool the detector 10 in order to keep the detector 10 in an optimal temperature range for operation. The temperature sensor 12 monitors the temperature TEMP of the detector 10. The signal processor 4 comprises a controller for the thermoelectric cooler 43. The controller 43 is configured to adjust a voltage of the thermoelectric cooler TEC+, TEC− according to the temperature TEMP measured by the temperature sensor 12.

The further amplifier 3 is a preamplifier and is configured to further process the output voltage of the amplifier 2 as the detector signal OUT. Thereby, an offset 32 and a gain 31 are added to the detector signal OUT. The detector signal OUT is further conducted to the signal processor 4.

The further amplifier 3 comprises a storage unit 5, in which several parameters of the signal chain are stored. The storage unit 5 is an EEPROM in the present embodiment. The storage unit 5 is connected to the signal processor 4 by a communication interface. The communication interface exchanges data via an $I^2C$ bus, which comprises two lines, a serial clock line SCL and a serial data line SDA. Hence, the parameters may be changed by the signal processor, for example to adjust the parameters of the signal chain to different applications or ambient conditions.

A gain value 310 and an offset value 320 are stored in the storage unit 5, as indicated by the dashed lines in FIG. 2. The gain value 610 and the offset value 320 determine the amount of gain 31 and offset 32 that is applied to the detector signal OUT.

The further amplifier 3 comprises a reset control 33. In particular, the reset control 53 comprises a reset logic 35, a ramp generator 36, an upper limit comparator 37 and a lower limit comparator 38. The ramp generator 36 in particular gives the minimal voltage value and the maximum voltage value for the output voltage of the amplifier, i.e., the detector signal OUT, wherein the gain 31 and the offset 32 are included accordingly. The minimal voltage value and the maximum voltage value are stored in the storage unit 5, as indicated by the dashed lines in FIG. 2. By the comparators 37, 38, the detector signal OUT is compared to the maximum voltage value and the minimal voltage value, respectively. The results of these comparisons is used as an input for the reset logic 35. The reset logic 35 is configured to process the reset pulse RESET provided by the signal processor 4. That is, the reset logic 35 controls the reset and applies the reset pulse RESET to the amplifier 2.

The further amplifier 3 is further configured to supply the detector 10 with voltages and comprises a supply voltage unit 30. The supply voltage unit 30 receives a high voltage HV from the signal processor 4 as an input. The high voltage HV is generated in a voltage source 44 of the signal processor 4. The supply voltage unit 30 adjusts the high voltage HV via voltage regulators 34 to the supply voltages for the detector 10, by which a drift field is formed in the detector 10. For example, the supply voltages comprise a backside contact voltage U_Back and several ring voltages U_R1 . . . . U_Rx. The values for the supply voltages are stored in the storage unit 5 as indicated by the dashed line in FIG. 2.

Alternatively it is possible that the only exactly one first storage voltage is stored in the storage unit. In this case, the further supply voltages for the detector are determined from the first supply voltage by arithmetic calculation.

For example, a backside contact voltage U_Back of the detector 10 is the first supply voltage and is controlled to a specific set value. In particular, the set value is stored in the storage unit 5. In this case several or all ring voltages U_R1 . . . . U_Rx of the detector may 10 be determined by applying certain factors, for example, by multiplying, adding or subtracting, to the backside contact voltage U_Back. For example, a certain factor is assigned to each ring voltage U_R1 . . . . U_Rx. Preferably, the factors are stored in the storage unit 5.

Furthermore, the further amplifier 3 comprises a thermoelectric cooler protection unit 39 which is configured to protect the thermoelectric cooler 11 from an overcurrent or overvoltage. The cooler protection unit 39 is operated according to parameters, i.e., a minimum and maximum voltage for the thermoelectric cooler 11 stored in the storage unit 5. The cooler protection unit 39 receives the supply voltages for the thermoelectric cooler TEC+, TEC− and adjusts them according to the respective parameters stored in the storage unit 5.

The amplifier 2 is supplied with supply voltages V_Sup+, V_Sup− by the further amplifier 3 that are provided by voltage regulators 34. The further amplifier 3 is supplied with supply voltages V_POS, V_NEG provided by the signal processor 4.

Figure 3:
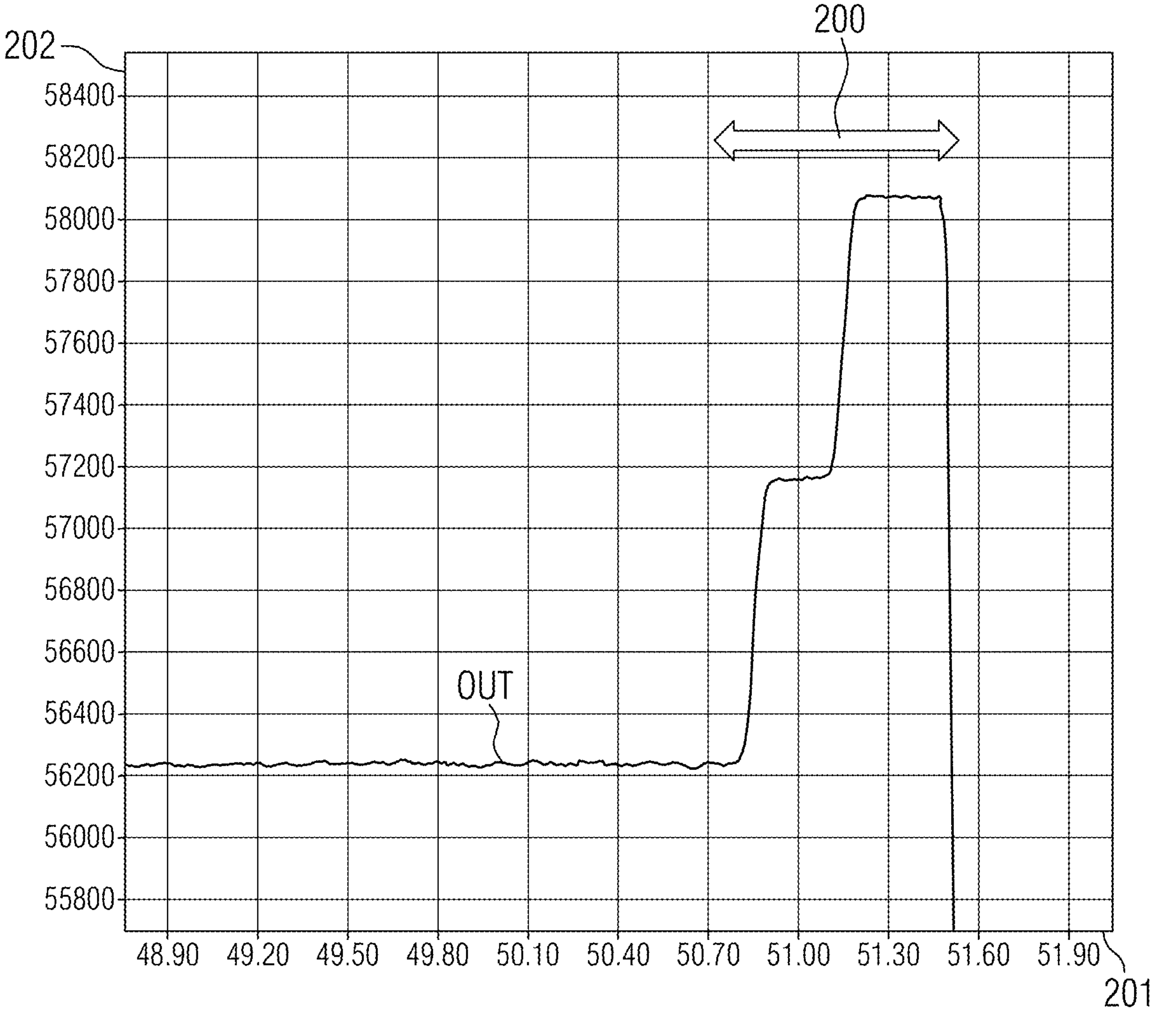
FIG. 3 shows a graphical representation of an output voltage of the amplifier according to a comparative example.

FIG. 3 shows a graphical representation of a detector signal OUT, given in ADC-codes 202, at an amplifier output according to a comparative example over time 201. In the comparative example, the evaluation of a detection event is immediately terminated if the detector signal OUT of the amplifier is above the threshold. In the comparative example the processing time determined by the signal processor 4 is about 2.5 μs. The detection event that leads to the threshold being exceeded, which is at 57,000 ADC-codes 202, is exceeded by the detection event, i.e., threshold event, detected at around 50.8 μs. A further detection event is detected at around 51.1 μs, which causes the reset to trigger. A total waiting time 200 between exceeding of the threshold and triggering of the reset is thus around 0.8 μs.

Figure 4:
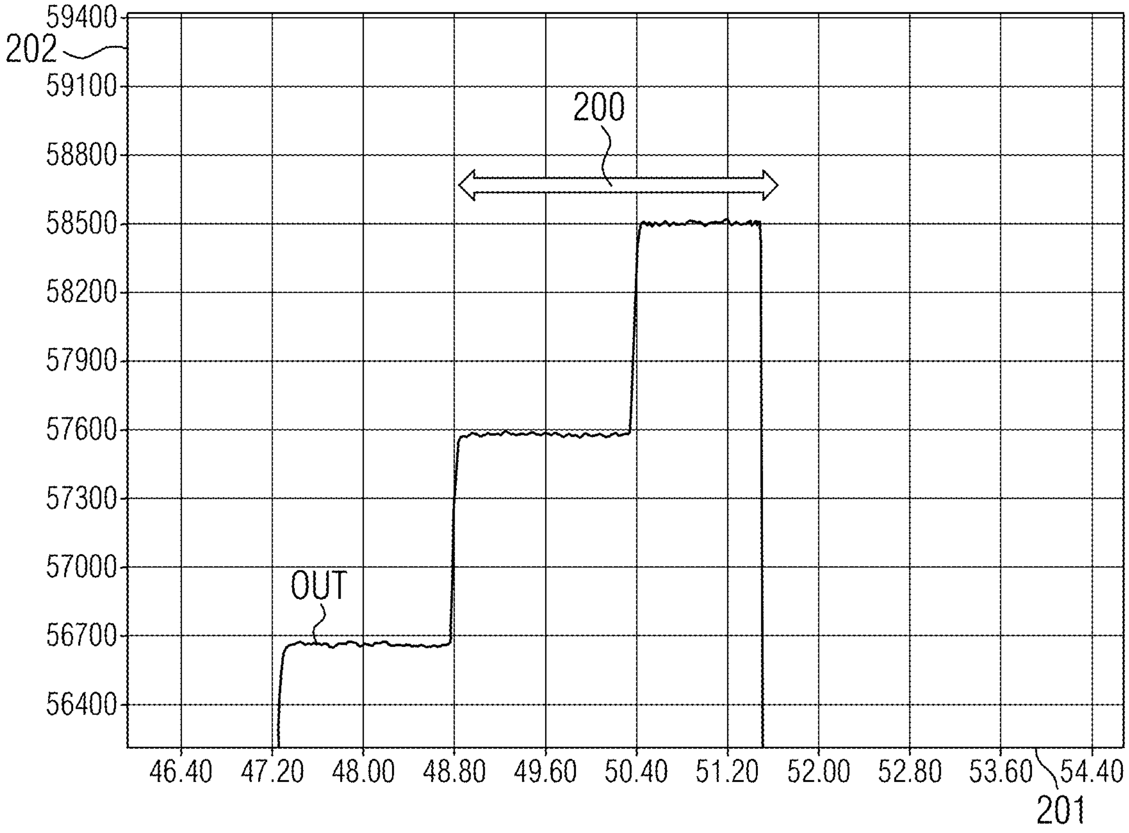
FIG. 4 shows a graphical representation of an output voltage of the amplifier according to an exemplary embodiment.

In contrast to FIG. 3, FIG. 4 shows the detector signal OUT as it is processed by an exemplary embodiment. The processing time in the exemplary embodiment of FIG. 4 is about 2.5 μs. The threshold is at 57,000 ADC-codes 202. FIG. 4 shows that the threshold is exceeded at around 48.8 μs. A further detection event is detected at around 50.4 μs. However, the evaluation of the threshold event is finished. Hence, the reset is triggered after a waiting time 200 of 2.5 μs.

From comparing FIG. 3 and FIG. 4 it can be seen that the method according to the exemplary embodiment is easier to carry out, since the reset is triggered after the processing time, i.e., the waiting time 200, independently of further detection events. That is, once the threshold is reached, the detector signal OUT does not need to be monitored for further detection events.

Figure 5:
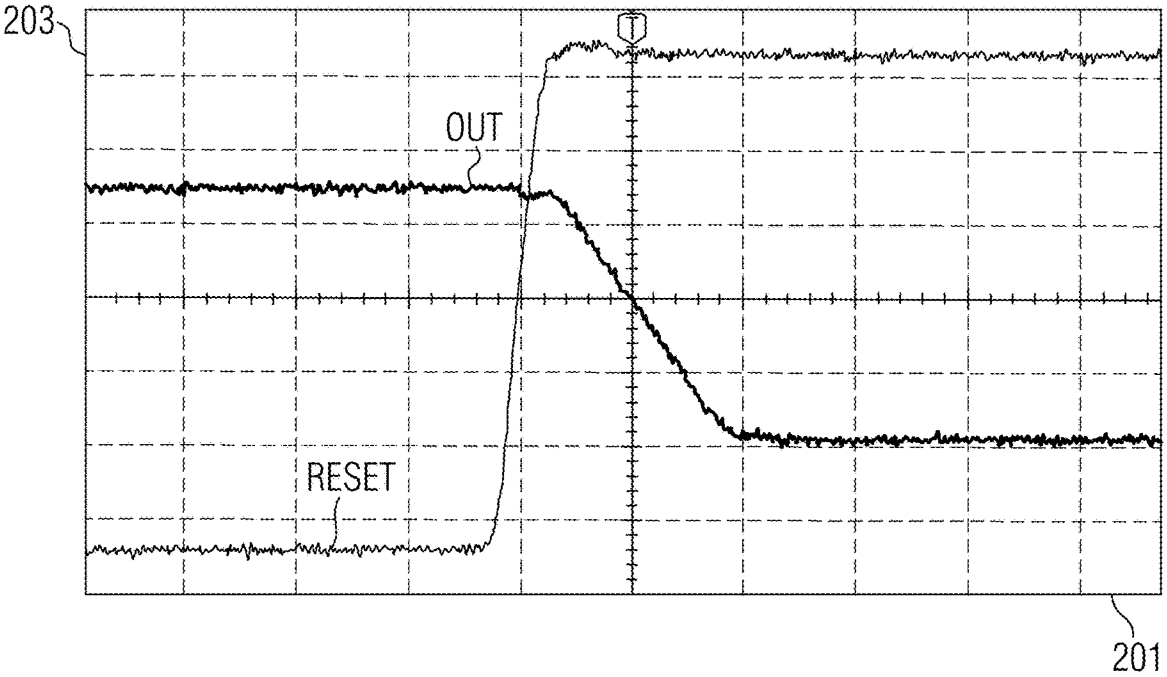
FIGS. 5 and 6 show graphical representations of a reset pulse used to reset an output voltage of the amplifier.
Figure 6:
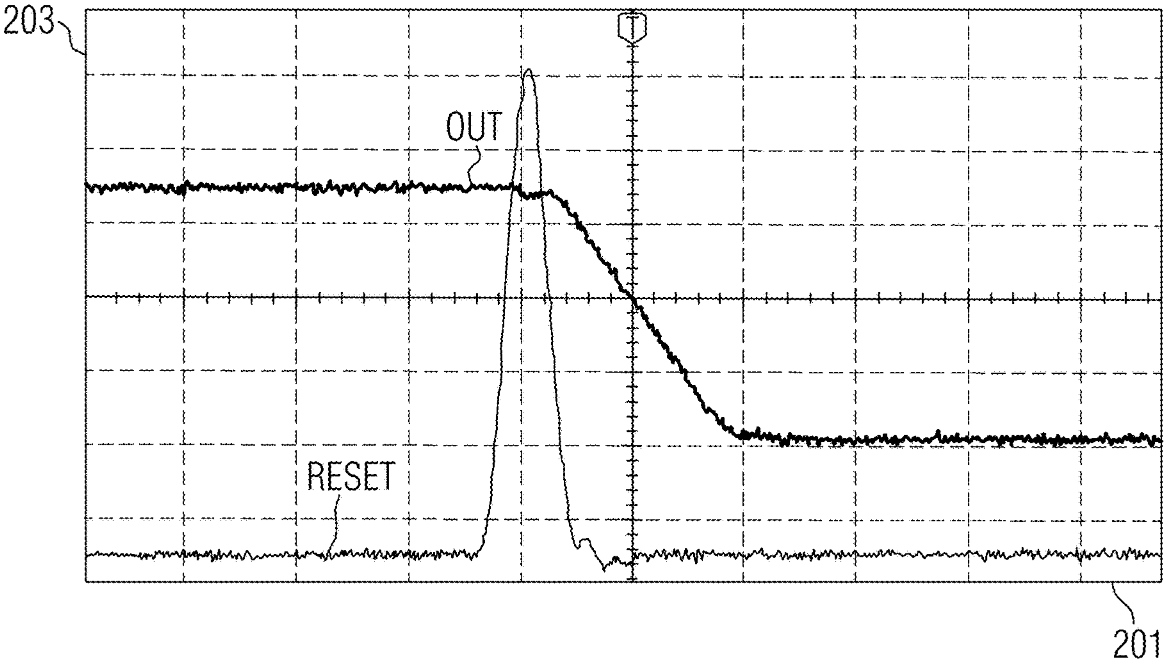

FIGS. 5 and 6 illustrate the independence of the reset from a pulse form of the reset pulse RESET. In the exemplary embodiments of FIGS. 5 and 6 the minimal voltage value is-1V and the threshold is around 750 mV. The output voltage OUT of the amplifier 2, i.e. the detector signal OUT at the output of the amplifier 2, steadily increases due to a leaking current of the detector 10. Once the threshold is reached, the reset is triggered by the reset pulse RESET. At time 201 zero the rising edge of the reset pulse RESET triggers the reset. That is, the reset input of the amplifier 2 is activated and a voltage at the reset input rises from 0 V (logical 0) to around 3.3 V (logical 1). The reset is performed to the minimal voltage value of −1 V.

In FIG. 5 the reset pulse RESET has a width that is greater than the scale of the Figure. Hence, in FIG. 5 the reset pulse RESET is represented as a step.

In FIG. 6, the reset pulse RESET has a significantly smaller width, which is even smaller than the time the detector signal OUT takes to reach the minimal value.

From comparing FIGS. 5 and 6 it can be seen that the reset to the minimal value is performed independently of a pulse form of the reset pulse RESET. Hence, it is avoided that the output voltage of the amplifier OUT is set below the minimal voltage, which causes the evaluation of detector signals to pause. At the same time the reset is, in any case, performed to the minimal value, making the whole working range of the ADC 40 of the signal processor 4 available for evaluation of the detector signal OUT. Advantageously, an expensive adaption of the reset pulse RESET is therefore unnecessary.

Figure 7:
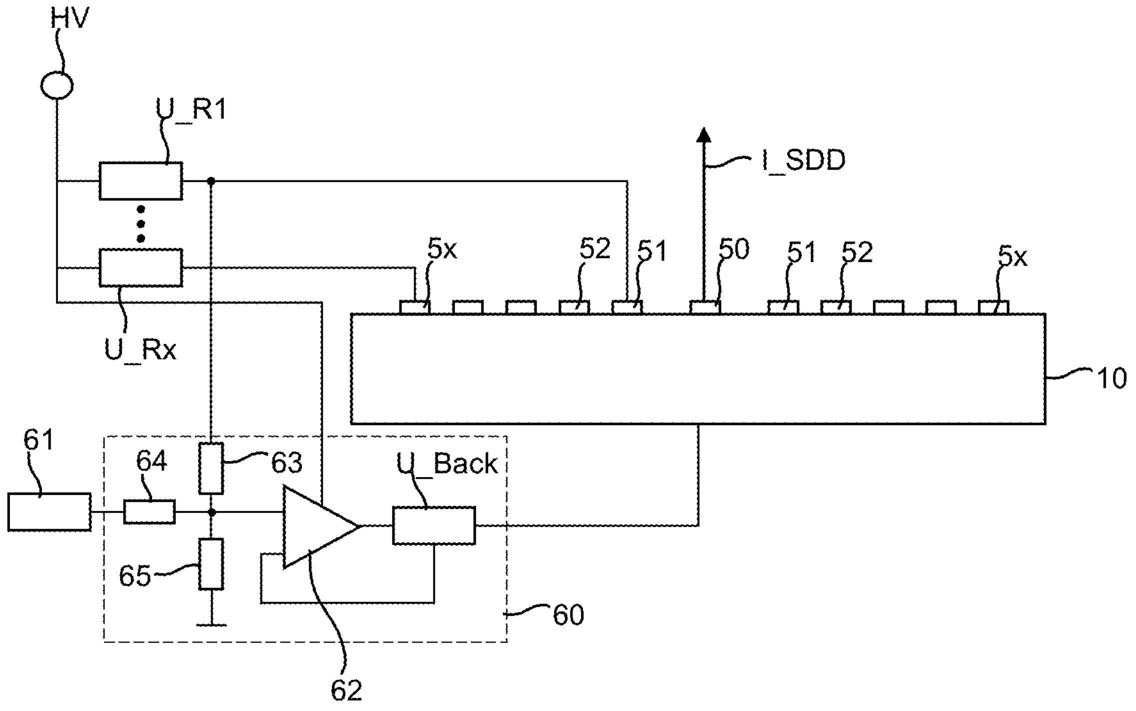
FIG. 7 shows an example for supplying power to a detector which may be used in a detector according to embodiments.

FIG. 7 illustrates an example for supplying power to a detector 10 which may be used in a detector device described here. The detector 10 is a silicon drift detector (SDD). The detector 10 comprises an anode as an output electrode 50 on a first main side of a semiconductor body. Around the output electrode 50 ring electrodes 51, 52, . . . , 5*x* are concentrically arranged. At a second main side opposing the first main side, a back side electrode is arranged (not shown).

During operation of the detector 10, ring voltages U_R1, . . . . U_Rx may be applied to the ring electrodes 51, . . . , 5*x*. For example, a first ring voltage U_R1 is applied to the first ring electrode 51. At the backside electrode a backside contact voltage U_Back is applied. By these voltages U_R1, . . . , U_Rx, U_Back, an electric field, i.e., the lateral drift field is generated in the semiconductor body, by which charge carriers that are generated in the semiconductor body during a detection event are guided to the output electrode 50. At the output electrode 50 a current I_SDD may be output to the amplifier (cf. FIG. 2).

The ring voltages U_R1, . . . , U_Rx are generated from a high voltage HV provided by a high voltage source as also illustrated by FIG. 2. In contrast to FIG. 2, voltage dividers by which the ring voltages U_R1, . . . , U_Rx are fixed. That is, the ring voltages U_R1, . . . , U_Rx are not controlled.

However, the ring voltages U_R1, . . . , U_Rx may not be constant and may vary, for example with temperature. Since a difference voltage between the first ring voltage U_R1 and the backside contact voltage U_Back significantly determine a signal rise time of the detector 10. Thus, in the example of FIG. 7 the backside contact voltage U_Back is controlled such that the difference voltage is constant.

For this controlling of the backside contact voltage U_Back a control circuit 60 is provided, which comprises a regulator. The control circuit 60 is provided with a set value

61 for the backside contact voltage U_Back, the first ring voltage U_R1 and the high voltage HV as inputs. The set value 61 is processed by a voltage divider formed by resistors 64, 65. The first ring voltage U_R1 is processed by a voltage divider formed by resistors 63, 65. At a node the first ring voltage U_R1 and the set value 61 are combined. The combined first ring voltage U_R1 and set value 61 are provided as a first input to an operational amplifier 62 of the control circuit 60. The output of the operational amplifier 62 is connected to the high voltage HV. In particular, the output of the operational amplifier 62 is combined with the high voltage HV to provide the backside contact voltage U_Back as an output of the control circuit 60. The output of the operational amplifier 62 is connected to a second input of the operational amplifier 62, thereby forming a feedback loop.

If the first ring voltage U_R1 changes, the combined voltage of the first ring voltage U_R1 and the set value 61 changes, thus causing a change in the backside contact voltage U_Back. The control circuit 60 is configured, inter alia by means of the feedback loop, to adjust the set value 61 such that the difference voltage between the first ring voltage U_R1 and the backside contact voltage U_Back is constant. Hence, the control circuit 60 is an active control circuit.

The invention is not restricted to the exemplary embodiments of the description on the basis of said exemplary embodiments. Rather, the invention encompasses any new feature and also any combination of features which in particular comprises any combination of features in the patent claims and any combination of features in the exemplary embodiments, even if this feature or this combination itself is not explicitly specified in the patent claims or exemplary embodiments.

What is claimed is:

1. A method for providing electrical power to a detector comprising a plurality of ring electrodes on a first main side and a backside electrode at a second main side opposite to the first main side, the method comprising:

providing a high voltage by a high voltage source;

generating ring voltages from the high voltage and supplying one ring voltage to each ring electrode; and generating a backside contact voltage from the high voltage and supplying the backside contact voltage to the backside electrode, wherein the ring voltages are uncontrolled, and wherein the backside contact voltage is adjusted such that a difference voltage between a first ring voltage and the backside contact voltage is constant.

2. The method according to claim 1, wherein adjusting the backside contact voltage is carried out by a control circuit.

3. The method according to claim 2, wherein the control circuit receives a set value for the backside contact voltage, the first ring voltage and the high voltage as an input, and wherein the control circuit generates the backside contact voltage from the high voltage depending on the set value and the first ring voltage.

4. The method according to claim 3, wherein the control circuit is an active control circuit, and wherein the control circuit actively adjusts the set value such that the set value generates a fixed or constant difference voltage between the first ring voltage and the backside contact voltage.

5. The method according to claim 1, wherein adjusting the backside contact voltage is carried out during operation of the detector.

6. A detector device comprising:

a silicon drift detector; and a control circuit, wherein the silicon drift detector comprises a plurality of ring electrodes on a first main side arranged concentrically around an output electrode, a backside electrode arranged on a second main side opposite to the first main side, wherein each of the ring electrodes is configured to be supplied with a ring voltage, wherein the backside electrode is configured to be supplied with a backside contact voltage, and wherein the control circuit is configured to fix a difference voltage between a first ring voltage and the backside contact voltage to a constant value.

7. The detector device according to claim 6, wherein the control circuit is configured to adjust the backside contact voltage such that the difference voltage is constant.

8. The detector device according to claim 6, wherein the silicon drift detector is configured to be provided with electrical power.

9. The detector device according to claim 6, further comprising a signal chain, wherein the signal chain comprises the silicon drift detector, an amplifier and a signal processor.

* * * * *